March 11, 1924.
A. E. WAGGONER
ELECTRIC FLATIRON
Filed April 14, 1919
1,486,314
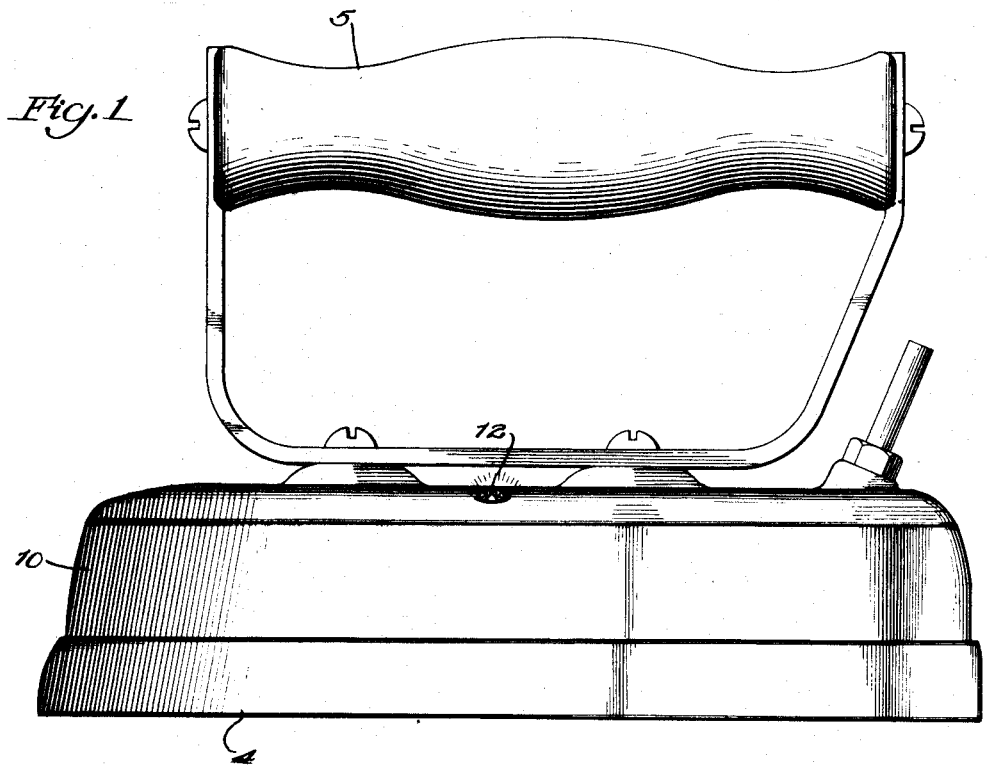
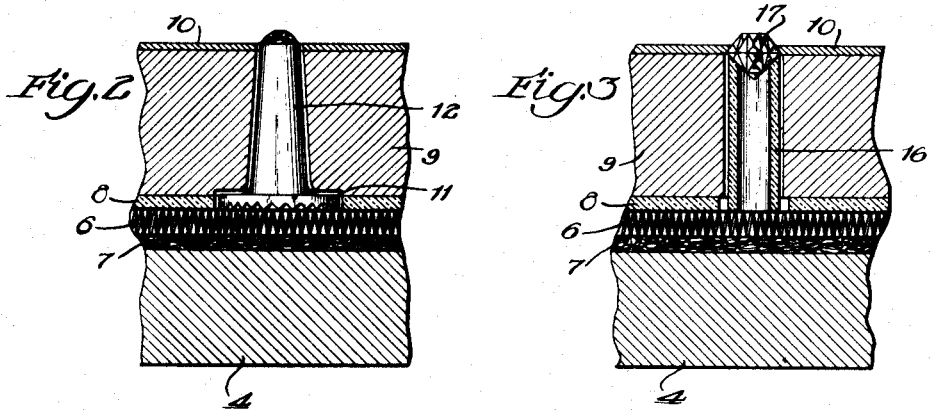
Inventor:
Albert E. Waggoner
By Fred Gerlach
his Atty.

Patented Mar. 11, 1924.

1,486,314

UNITED STATES PATENT OFFICE.

ALBERT E. WAGGONER, OF CHICAGO, ILLINOIS.

ELECTRIC FLATIRON.

Application filed April 14, 1919. Serial No. 289,949.

*To all whom it may concern:*

Be it known that I, ALBERT E. WAGGONER, a citizen of the United States, and a resident of Chicago, in the county of Cook and State of Illinois, have invented certain new and useful Improvements in Electric Flatirons, of which the following is a full, clear, and exact description.

The invention relates to electric flat irons and its object is to provide improved means for indicating whether or not current is passing through the resistance element.

This object of the invention is attained primarily by providing an indicator which, at a clearly visible point, will by illumination indicate whether the resistance element is at red heat or not.

The invention consists in the several novel features hereinafter set forth and more particularly defined by claims at the conclusion hereof.

In the drawings: Fig. 1 is a side elevation of a flat iron embodying the invention. Fig. 2 is a section showing the improved indicator and Fig. 3 is a detail section of a modification.

The invention is illustrated as exemplified in a flat iron comprising a base 4 which may be of usual construction, a handle 5, suitably secured to the base, and a resistance element 6 interposed between asbestos insulation 7, mica insulation 8 and a metal body or filling 9 between the mica insulation and the enclosing shell 10. It will be understood that current will be supplied to the resistance element in manner well understood in the art.

An indicator comprises a disk 11 having prismal formations on its lower face and a stem 12 which extends through the shell 10 to a point on top of the shell near one side thereof. This indicator is made entirely of glass and, as a result, when the resistance coil is red hot or glowing, the indicator will be illuminated by the said element, so that the upper end will clearly indicate the condition of the resistance element.

In Fig. 3, there is shown a modification in which the indicator consists of a glass tube 16 and a jewel glass 17 held at the upper end of the tube by the shell 10. In this modification, the glow of the resistance element 6 illuminates the jewel-glass 17 and clearly indicates the condition of said element.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A flat iron comprising a resistance element adapted to emit light when in operation and a body enclosing said element and having an opening therein to expose a portion of said element to permit an indication of its condition.

2. A flat iron comprising a resistance element adapted to emit light when in operation, a body enclosing said element and having an opening therein to expose a portion of said element to permit an indication of its condition, and a transparent indicator in said opening.

3. A flat iron comprising a resistance element adapted to emit light when in operation, a body enclosing said element and having an opening thereto to expose a portion of said element to permit an indication of its condition, and transparent indicating means extending into proximity to said exposed portion of the element and to the exterior of said body.

4. In an electrically heated tool the combination with a tool body of a coil for heating said tool body adapted to emit light when in operation, said tool body having a sight opening through which a portion of the heating coil is visible, whereby when the current is turned on the incandescence of said portion is visible, thus giving an indication as to the fact that the current is on.

5. In an electric flat iron, a plurality of plates, a heating element confined therebetween, a casing for housing said element and one of said plates, one wall of said casing being provided with a sight opening and one of said plates being provided with an opening in alinement with said sight opening and exposing a portion of said element.

6. In an electric flat iron, a casing, a plurality of plates, a heating element confined therebetween, one of said plates being provided with an opening to expose a portion of said heating element and said casing being provided with a sight opening in alinement with said first named opening.

ALBERT E. WAGGONER.